United States Patent [19]

Toyama et al.

[11] Patent Number: 4,559,917
[45] Date of Patent: Dec. 24, 1985

[54] AIR INTAKE SIDE SECONDARY AIR SUPPLY SYSTEM FOR AN INTERNAL COMBUSTION ENGINE EQUIPPED WITH EXHAUST GAS RECIRCULATION SYSTEM

[75] Inventors: Shozo Toyama, Tokyo; Fumio Yatabe, Kawagoe, both of Japan

[73] Assignee: Honda Giken Kogyo Kabushiki Kaisha, Tokyo, Japan

[21] Appl. No.: 636,427

[22] Filed: Jul. 31, 1984

[30] Foreign Application Priority Data

Aug. 4, 1983 [JP] Japan .................. 58-121669[U]

[51] Int. Cl.⁴ ............................. F02M 25/06
[52] U.S. Cl. .................. 123/571; 123/587; 123/589
[58] Field of Search ........... 123/568, 569, 571, 585, 123/587, 588, 589

[56] References Cited

U.S. PATENT DOCUMENTS

| | | | |
|---|---|---|---|
| 4,007,719 | 2/1977 | Brettschneider | 123/589 X |
| 4,037,406 | 7/1977 | Hartel | 123/589 X |
| 4,304,210 | 12/1981 | Hayakawa | 123/571 |
| 4,359,034 | 11/1982 | Mase et al. | 123/571 |
| 4,416,239 | 11/1983 | Takase et al. | 123/571 X |
| 4,483,308 | 11/1984 | Hasegawa | 123/571 |

FOREIGN PATENT DOCUMENTS

0159553 12/1981 Japan .................. 123/589

Primary Examiner—Craig R. Feinberg
Assistant Examiner—W. R. Wolfe
Attorney, Agent, or Firm—Pollock, Vande Sande & Priddy

[57] ABSTRACT

An air intake side secondary air supply system for an internal combustion engine equipped with an exhaust gas recirculation (EGR) system, employing a single source of control pressure for supplying a control pressure both into an air control valve for controlling the amount of the air intake side secondary air and an EGR control valve for controlling the amount of exhaust gas recirculation. The system is provided with a delay means for delaying the transmission of a fluctuation of pressure in the pressure chamber of the air control valve to a pressure chamber of the EGR control valve, thereby preventing adverse effects on the EGR operation due to an interaction between the air intake side secondary air supply system and the EGR system.

2 Claims, 11 Drawing Figures

AIR INTAKE SIDE SECONDARY AIR SUPPLY SYSTEM FOR AN INTERNAL COMBUSTION ENGINE EQUIPPED WITH EXHAUST GAS RECIRCULATION SYSTEM

BACKGROUND OF THE INVENTION

1. Field of the Invention

The present invention relates to an air intake side secondary air supply system for an internal combustion engine equipped with exhaust gas recirculation (EGR) system.

2. Description of Background Information

In an internal combustion engine provided with a three-way catalytic converter in the exhaust system, the air/fuel ratio of the engine is controlled around a stoichiometric value (14.7:1 for example) in accordance with the composition of exhaust gas and the operating conditions of the engine in order to provide an optimum operation of the three-way catalytic converter. The so called air intake side secondary air supply system is an example of the air/fuel ratio control system of this type which has a secondary air passage leading to a portion of an intake air passage downstream of the throttle valve and in which the amount of the secondary air passing therethrough is controlled by varying the sectional area of the secondary air passage.

The secondary air supply system is often provided with an air control valve which is disposed in the secondary air supply passage for varying the sectional area thereof and the opening degree of the air control valve is controlled according to the magnitude of the pressure applied to a pressure chamber of the air control valve. In this case, the pressure chamber is supplied with a control pressure which varies with the operating conditions of the engine. Further, an actual air/fuel ratio is detected from an oxygen concentration of the exhaust gas, and the secondary air is supplied, via the air control valve, to a downstream part from the throttle valve, for example by controlling the control pressure, when the detected air/fuel ratio is rich and the supply of the secondary air is stopped or the amount of the secondary air is gradually reduced when the detected air/fuel ratio is lean.

In internal combustion engines, it is also necessary to decrease the combustion temperature in the cylinders to prevent the formation of NOx (Nitrogen Oxides) which is one of noxious components contained in the exhaust gas of the engine. Therefore, some internal combustion engines are provided with an exhaust gas recirculation (EGR) system for reducing the combustion temperature, which recirculates a part of exhaust gas into the intake air passage to slow down the combustion process to an extent which does not affect the engine performance. The exhaust gas recirculation system generally includes an EGR passage connecting the exhaust passage and the intake air passage, and a vacuum operated EGR flow control valve disposed in the EGR passage for varying the sectional area of the EGR passage in accordance with the level of the pressure applied to a pressure chamber thereof. The pressure chamber of the EGR flow control valve is generally applied with a control pressure which varies with the operating conditions of the engine.

If an internal combustion engine equipped with the EGR system is provided with the air intake side secondary air supply system, it is necessary to vary the opening degree of the air control valve and the EGR flow control valve according to various operating conditions of the engine. Therefore it is desirable to supply a control pressure from a single source of the control pressure, which varies with the operating conditions of the engine, an amount of the intake air for example, to pressure chambers of the air control valve and the EGR control valve to simplify the total construction of the peripheral systems of the internal combustion engine and to reduce production costs.

On the other hand, in the air intake side secondary air supply system, an open/close valve may be disposed in an air intake side secondary air passage so as to stop the supply of the air intake side secondary air in accordance with the detected result of the air/fuel ratio which is determined from the above mentioned exhaust gas composition. In this case, the response of the open/close valve against a secondary air supply command is relatively good if the open/close valve is disposed in the air intake side secondary air supply passage downstream of the air control valve. However, if the difference of the atmospheric air pressure and the vacuum of the downstream of the throttle valve becomes large when the vacuum of the downstream of the throttle valve is applied to the valve element of the air control valve such as a needle valve via the air intake side secondary air passage and the open/close valve, the valve element of the air control valve tends to be sucked to the direction to close the valve or moved to the direction to close the valve. This motion of the valve element will in turn cause a motion of the diaphragm which forms a part of the pressure chamber of the air control valve, and causes the expansion and the contraction of the volume of the pressure chamber and the pulsation of the pressure in the pressure chamber. However, when the air control valve and the EGR control valve are supplied with the pressure from the same source of the control pressure as mentioned above, and the pressure chamber of the air control valve is communicated with the pressure chamber of the EGR control valve via the pressure supply passage, the problem is that the pulsation of the pressure in the pressure chamber of the air control valve in turn causes the pulsation of the pressure in the pressure chamber of the EGR valve due to the communication through the pressure supply passage. This pulsation may become a cause of various adverse effects to the operation of the EGR system.

SUMMARY OF THE INVENTION

An object of the present invention is therefore to provide an air intake side secondary air supply system for an internal combustion engine equipped with the EGR control system, which can prevent the adverse effect to the EGR system operation by the pulsation of the pressure in the pressure chamber of the air control valve although the pressure chamber of the air control valve and the pressure chamber of the EGR control valve are supplied with the control pressure from a single source of the control pressure.

To this end, the present invention provides an air intake side secondary air supply system having a delay means for delaying the transmission of the pressure from the pressure chamber of the air control valve to the EGR control valve.

The foregoing and other objects and advantages of the present invention will become more clearly understood upon review of the following description taken in conjunction with the accompanying drawings.

DETAILED DESCRIPTION OF A PREFERRED EMBODIMENT

Figure 1:
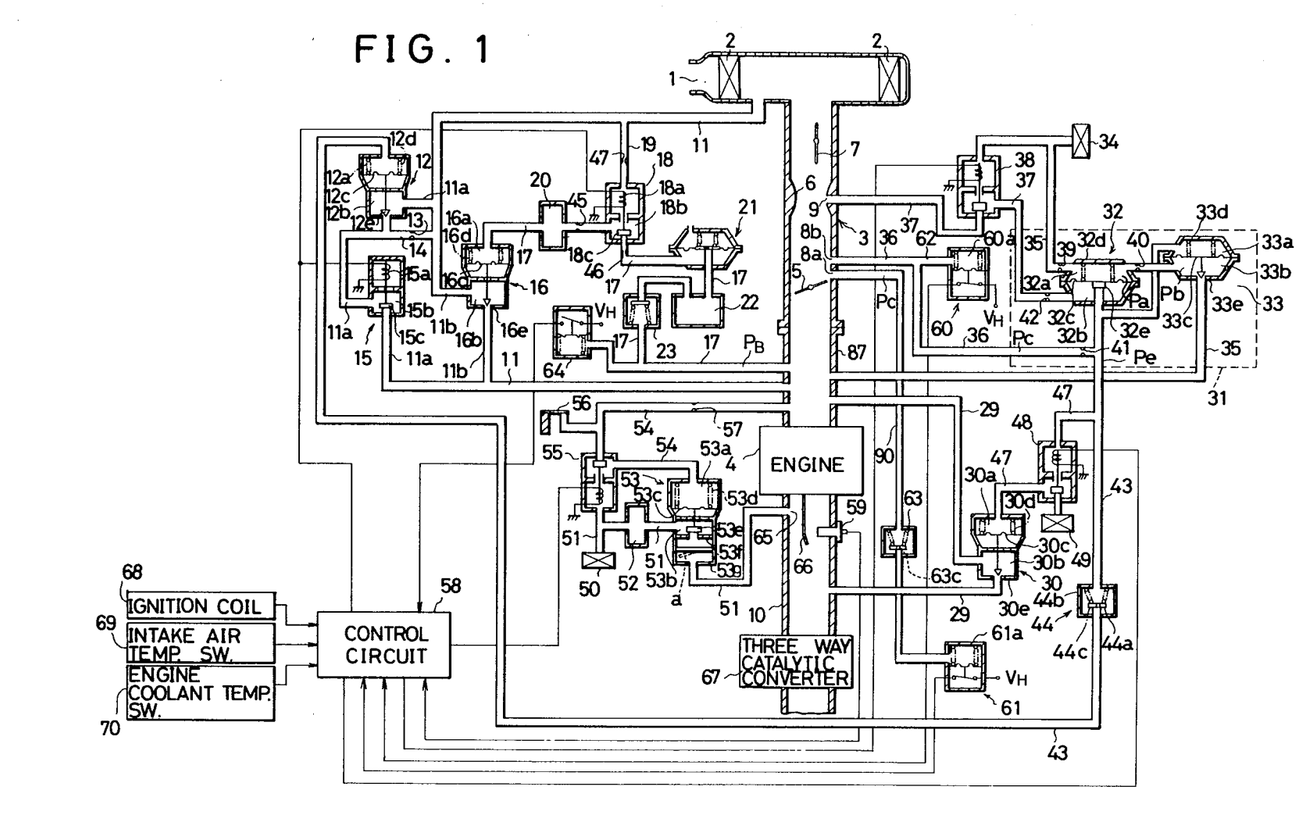
FIG. 1 is a schematic diagram of an embodiment of the air intake side secondary air supply system of the present invention.

In FIG. 1 in which the preferred embodiment of the air intake side secondary air supply system of the present invention is illustrated, intake air taken at an atmospheric air inlet port 1 is supplied to an engine 4 via an air cleaner 2 and a carburetor 3. The carburetor 3 is provided with a throttle valve 5, a venturi 6 upstream of the throttle valve 5, and a choke valve 7 is provided upstream of the venturi 6. In a throttle body, vacuum detection holes 8a and 8b are provided near the position of the throttle valve 5, such that the vacuum detection holes 8a and 8b are positioned upstream of the throttle valve when the throttle valve 5 is closed and downstream of the throttle valve 5 when the throttle valve is opened. A vacuum detection hole 9 is also provided to the venturi 6. A portion of the throttle body downstream of the throttle valve 5, i.e. an intake manifold 87, is communicated with the vicinity of the outlet port of the air cleaner 2 via a air intake side secondary air supply passage 11. In the middle of the air intake side secondary air supply passage 11, the passage is divided into two air control passages 11a and 11b so that the secondary air is diverted into two streams. A first air control valve 12 is provided in the air control passage 11a. The first air control valve 12 consists of a vacuum chamber 12a which forms a second pressure chamber and a valve chamber 12b which forms a part of the air control passage 11a, a diaphragm 12c forming a part of the vacuum chamber 12a, a valve spring 12d, a tapered valve element 12e disposed in the valve chamber 12b and forced to close the air control passage 11a by means of the valve spring 12d. With this construction, the air control valve 12a varies the sectional area of the air control passage 11a in accordance with the magnitude of the vacuum applied to the vacuum chamber 12a. An air correction passage 14 is provided so as to bypass the first air control valve 12, and an orifice 13 for adjusting the idling condition is formed in the air correction passage 14.

Further, an electromagnetic valve 15 operating as the open/close valve is disposed in the air control passage 11a, downstream of the air control valve 12. The electromagnetic valve 15 consists of a solenoid 15a, a valve chamber 15b forming a part of the air control passage 11a, a valve element 15c disposed in the valve chamber 15b and magnetically connected to the solenoid 15a, and makes the communication through the air control passage 11a when the solenoid 15a is energized. The vacuum acting in the pressure chamber 12a of the first air control valve 12 is controlled by a vacuum control part 31.

The vacuum control part 31 is made up of a vacuum responsive regulation valve 32 and an air valve 33 which respectively consist of a vacuum chamber 32a or 33a, a valve chamber 32b and 33b, a diaphragm 32c or 33c, a valve spring 32d or 33d, and a valve element 32e or 33e. The vacuum chamber 32a is placed in the middle of a control intake air passage 35 which starts from an air inlet port 34 with a filter and leads to a part of the intake air passage downstream of the throttle valve 5 and the valve chamber 33b of the air valve 33 is also disposed in the control air passage 35 downstream of the vacuum chamber 32a. The valve element 33e is forced to close the control air passage 35 by means of the valve spring 33d via the diaphragm 33c. The vacuum chamber 33a is communicated with the vacuum detection hole 8b via a vacuum passage 36. The valve chamber 32b is communicated with the vacuum detection hole 9 via a vacuum passage 37 in which an electromagnetic valve 38 is disposed. When energized, the electromagnetic valve 38 makes the communication through the vacuum passage 37 and closes the vacuum passage 37 and opens a part of the vacuum passage 37 on the side of the vacuum detection hole 9 to the atmosphere when deenergized. The valve chamber 32b is communicated with the vacuum passage 36 and the valve element 32e is urged by the valve spring 32d via the diaphragm 32c so as to close the communication from the valve chamber 32b to the vacuum passage 36. In addition, orifices 39, 40 are provided in the control air passage 35, respectively upstream and downstream of the vacuum chamber 32a and orifices 41 and 42 are provided respectively in the vacuum passages 36 and 37. A part of the vacuum passage 36 on the side of the valve chamber 32b and the vacuum chamber 33, from the orifice 41 is communicated with the vacuum chamber 12a of the first air control valve 12 via the vacuum supply passage 43. In the vacuum supply passage 43, there is provided a non-return valve 44 which includes a valve element 44a urged by a valve spring 44b so as to close the vacuum supply passage on the side of the vacuum chamber 12a. Further, an orifice 44c is provided in the valve element 44a so as to always make a slight communication through the non-return valve 44.

On the other hand, in the air control passage 11b, there is provided a second air control valve 16 which is constructed in the same manner as the first air control valve 12, and consists of a vacuum chamber 16a, a valve chamber 16b, a diaphragm 16c, a valve spring 16d, and a tapered valve element 16e. The second air control valve 16 controls the sectional area of the air control passage 11b in accordance with the magnitude of the vacuum applied to the vacuum chamber 16a, in a manner that the sectional area increases as the magnitude of the vacuum increases. The vacuum chamber 16a is communicated with the part of the air intake passage downstream of the throttle valve 5 via the vacuum supply passage 17. In the vacuum supply passage 17, there is provided an electromagnetic valve 18 which is made up of a solenoid 18a, a valve chamber 18b which forms a part of the vacuum supply passage 17, a valve element 18c disposed in the valve chamber 18b and magnetically connected to the solenoid 18a. The valve chamber 18b is communicated to the atmosphere via the atmospheric pressure supply passage 19 and closes the vacuum supply passage 17 when deenergized and at the same time a part of the vacuum supply passage on the side of the vacuum chamber 16a is communicated with the atmospheric pressure supply passage 19 via the valve chamber 18b. A surge-tank 20 is provided in the vacuum supply passage 17 on the side of the vacuum chamber from the electromagnetic valve 18, and a constant vacuum control valve 21, a storage tank 22, and a non-return valve 23 are provided in this order in the vacuum supply passage 17 on the side of the downstream portion of the throttle valve 5 from the electromagnetic valve 18. The constant vacuum control valve 21 is adapted to stabilize the magnitude of the vacuum of the downstream portion of the throttle valve 5 to a vacuum which has a predetermined constant level when this magnitude of vacuum is greater than the predetermined value, and the non-return valve only permits the flow of the air in the direction to the downstream portion of the throttle valve 5. In addition, orifices 45, 46 are provided in the vacuum supply passage on both sides of the electromagnetic valve 18, and an orifice 47 is provided in the atmospheric pressure supply passage 19.

The intake manifold downstream of the throttle valve 5 is communicated with an exhaust manifold 10 via an exhaust gas recirculation (EGR) passage 29. In the middle of the EGR passage 29, there is provided an EGR control valve 30 which is constructed in the the same manner as the first and the second air control valves 12 and 16. In other words, the EGR control valve 30 consists of a vacuum chamber 30a, a valve chamber 30b, a diaphragm 30c, a valve spring 30d, and a valve element 30e and varies the sectional area of the EGR passage 29 according to the magnitude of the vacuum operating in the vacuum chamber 30a, which acts as the first pressure chamber, in such a manner that the sectional area increases as the magnitude of the vacuum increases. The vacuum chamber 30a is communicated with the vacuum supply passage on the side of the vacuum control part from the non-return valve 44 through the vacuum supply passage 47 in which an electromagnetic valve 48 is provided. When deenergized, the electromagnetic valve 48 makes the communication through the vacuum supply passage 47 and closes the vacuum supply passage 47 on the side of the vacuum supply passage 43 and at the same time makes the communication of the vacuum supply passage 47 on the side of the vacuum chamber 30a and an atmospheric air inlet port 49 with a filter when energized.

On the other hand, the exhaust manifold 10 is communicated with an atmospheric air inlet port 50 with a filter through an exhaust side secondary air passage 51. In the exhaust side secondary air passage 51, there are provided an intake air chamber 52 and an exhaust side secondary air control valve 53 on the side of the exhaust manifold 10 from the intake air chamber 52. The exhaust side secondary air control valve 53 is made up of a vacuum chamber 53a, a valve chamber 53b which forms a part of the exhaust side secondary air passage 51, and a diaphragm 53c which forms a part of the vacuum chamber 53a, a valve spring 53d disposed in the vacuum chamber 53a, a valve element 53e disposed in the valve chamber 53b and urged by the valve spring 53d via the diaphragm 53c so as to close the exhaust side secondary air passage 51, a valve seat 53f which together with the valve element 53e determines the sectional area of the exhaust side secondary air supply passage 51, and a non-return valve 53g for preventing a back flow. The vacuum chamber 53a is communicated with the intake manifold downstream of the throttle valve 5 via a vacuum supply passage 54 in which an orifice 57 and an electromagnetic valve 55 are provided. The electromagnetic valve 55 closes the vacuum supply passage 54 downstream of the throttle valve 5 and at the same time opens a part of the vacuum supply passage 54 on the side of the vacuum chamber 53a to the atmosphere when deenergized. When energized, the electromagnetic valve 55 makes the communication through the vacuum supply passage 54. A part of the vacuum supply passage 54 on the side of the downstream portion of the throttle valve 5 from the electromagnetic valve 55 is opened to the atmospheric air only when the intake air temperature is above a predetermined level by means of a bimetal type temperature sensitive valve 56 so that the secondary air is supplied to the intake manifold 87 downstream of the throttle valve 5 through the secondary air supply passage 54.

The solenoids of the electromagnetic valves 15, 18, 38, 48, and 55 are electrically connected to a control circuit 58 which includes a plurality of drive circuits. The control circuit 58 is applied with an output signal of an oxygen sensor 59 which is disposed in the exhaust manifold 10 and produces the output voltage $V_{O_2}$ whose level is responsive to the oxygen concentration in the exhaust gas. The output voltage level of the oxygen sensor increases as the oxygen concentration becomes high. In addition to the above elements, vacuum switches 60, 61, 64, and an ignition coil 68, an intake air temperature switch 69, and an engine coolant temperature switch 70 are connected to the control circuit 58.

The vacuum switches 60 and 61 are provided to detect the engine load from the magnitude of the vacuum Pc which is present in the vacuum detection hole 8a or 8b. A vacuum chamber 60a of the vacuum switch 60 is communicated with the vacuum passage 36 via a vacuum passage 62, and the vacuum switch 60 turns on when the magnitude of the vacuum Pc supplied from the vacuum detection hole 8b is lower than a predetermined second pressure $P_2$ (150 mm Hg for instance). The vacuum chamber 61a of the vacuum switch 61 is communicated with the vacuum detection hole 8a through a vacuum passage 90 and the vacuum switch 61 turns on when the level of the vacuum supplied to the vacuum chamber 61a is lower than a predetermined first pressure $P_1$ (30 mm Hg for instance). Thus, when the vacuum switch 60 or 61 is turned on, a high level signal having a voltage level $V_H$ corresponding to the logic "1" is supplied to the control circuit 58. The vacuum supply passage 90 is provided with a non-return valve 63 which is constructed in the same manner as the non-return valve 44. A vacuum switch 64 is provided to detect an operating condition of the engine in which the magnitude of the vacuum $P_B$ downstream of the throttle valve 5 is higher than a predetermined third pressure level $P_3$ (250 mm Hg for instance).

A separator wall 66 is provided in the exhaust manifold 10 between the position of the oxygen sensor 59 and a secondary air supply port 65 of the secondary air supply passage 51 so as to prevent the exhaust side secondary air from flowing into the position of the oxygen sensor 59. Further, a three-way catalytic converter 67 is provided in the exhaust manifold, downstream of the oxygen sensor 59.

Figure 2:
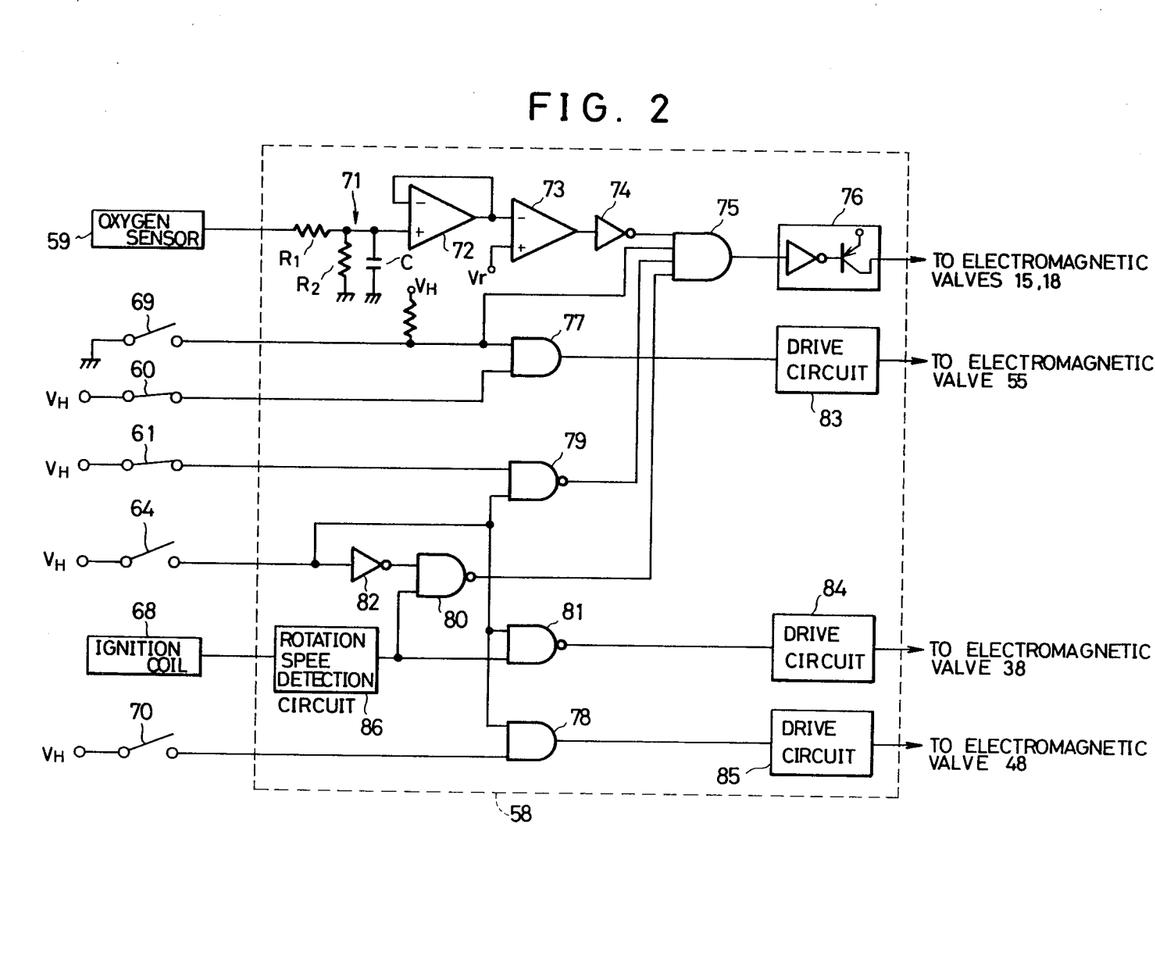
FIG. 2 is a block diagram showing the construction of the control circuit used in the system of FIG. 1.

As shown in FIG. 2, the control circuit 58 includes a smoothing circuit 71 which includes resistors $R_1$ and $R_2$ and a capacitor C for dividing and smoothing the output voltage of the oxygen sensor 59, a buffer amplifier 72 connected to the output terminal of the smoothing circuit 71, a comparator for comparing an output signal of the buffer amplifier 72 with a predetermined reference voltage Vr, a four input AND circuit gate 75 connected to the output terminal of the comparator 73 via an inverter 74, and drive circuit 76 which drives the electromagnetic valves 15 and 18 when the output signal level of the AND gate is high. Further, the control circuit includes AND gates 77 and 78, NAND gates 79 to 81, inverter 82, drive circuits 83 to 85, and a rotation speed detection circuit 86. The rotation speed detection circuit 86 counts the number of ignition pulses which are supplied from the ignition coil for detecting the engine speed and for producing a high level output signal when the engine speed is higher than a predetermined speed (2700 r.p.m. for instance).

Among the operations of the thus constructed air intake side secondary air supply system of the present invention, the operation of the vacuum control part 31 will be explained first. When a vacuum Pc from the vacuum detection hole 8 is applied to the vacuum chamber 33a via the vacuum passage 36 in accordance with the operation of the engine 4, the valve element 33e will be displaced in a direction to open the valve 33 if the vacuum pressure Pc is greater than the resilient force of the valve spring 33d. By the opening of the air valve 33, outside air from the atmospheric air inlet port 34 is introduced to the intake manifold 87 downstream of the throttle valve 5, via the control air passage 35. The vacuum Pa and the vacuum Pb respectively in the vacuum chamber 32a through which the outside air travels and in the valve chamber 33b, are determined in accordance with the aperture ratios of the orifices 39 and 40 respectively.

In this condition, if the differential pressure between the vacuum Pv from the vacuum detection hole 9 operating in the valve chamber 32b and the vacuum Pa is greater than the resilient force of the valve spring 32d, the valve element 32e will be displaced in the direction to open the valve 32. By the opening of the control valve 32, a part of the vacuum Pv is directed to dilute the vacuum Pc past the orifice 41 to produce a vacuum Pe.

Subsequently, due to the fall of the vacuum Pc consequent on the fall of the vacuum Pe, the opening degree of the air valve 33 is decreased to reduce the amount of the air flowing through the control air passage 35. By this reduction in the air flow amount, the vacuum Pa in the vacuum chamber 32a is reduced to close the regulation valve 32. Thus the vacuum Pe is raised once more and the above sequential operations will be repeated. It is to be noted that the ratio between the vacuum Pv and the vacuum Pe becomes equal to the ratio between the vacuum Pa and the vacuum Pb, since the speed of these repeating operations is very fast.

Therefore, when the amount of the main intake air of the engine 4 is relatively small where the vacuum Pa is greater than Pv, the opening degree of the regulation valve 32 becomes large and the vacuum Pe becomes low. On the other hand, as the amount of the main intake air increases, the opening degree of the regulation valve 32 becomes smaller since the vacuum Pv increases, and consequently the vacuum Pe becomes high. The vacuum Pe is applied to the vacuum chamber 33a and the vacuum chamber 12a of the first air control valve 12, and to the vacuum chamber 30a of the EGR control valve 30 when the electromagnetic valve 48 is deenergized, so as to open the air control valve 33, the first air control valve 12 and the EGR control valve 30. Therefore, the amount of the air flowing through the control air passage 35 for opening the air valve 33 and the amount of the secondary air flowing through the first air control valve 12 when the electromagnetic valve 15 is opened, and the amount of the exhaust gas flowing through the the EGR passage 29 when the electromagnetic valve 48 is deenergized become proportional with each other. Since the amount of the air flowing through the air control passage is proportional to the main intake air of the engine, the amount of the above mentioned secondary air and the amount of the EGR gas become proportional to the amount of the main intake air of the engine. Therefore, the level of the vacuum Pe becomes proportional to the amount of the main intake air, and in the EGR system a predetermined desired amount of EGR is always enabled. The EGR ratio is determined according to the ratio between the Pv and the Pe, that is, the ratio between the aperture ratios of the orifices 39 and 40.

In the control circuit 58, the voltage level Va of the buffer amplifier 72 is varied according to the voltage level of the output signal of the oxygen sensor 59. If the voltage level Va is greater than a predetermined voltage level Vr, the voltage indicates that the air/fuel ratio is rich. In this condition, the output signal level of the comparator 73 becomes low. If the output voltage level Va is lower than the predetermined level Vr, the voltage indicates that the air/fuel ratio is lean, and the output signal level of the comparator 73 becomes high under this condition. The logic state of the output signal of the comparator 73 is inverted by the inverter 74 and applied to the AND circuit 75.

In response to the lean signal, the drive circuit 76 deenergizes the solenoids 15a and 18a, and the electromagnetic valves 15 and 18 are made inoperable. On the other hand, the drive circuit 76 energizes the solenoids 15a and 18a in response to the rich signal, and the electromagnetic valves 15 and 18 are made operable. When the electromagnetic valves 15 and 18 are inoperable, the control air passage 11a is closed by the electromagnetic valve 15 and the vacuum supply passage 17 is closed by the electromagnetic valve 18 and the part of the vacuum supply passage on the side of the vacuum chamber 16a is communicated to the atmospheric pressure supply passage 19. Therefore, the pressure in the vacuum chamber 16a is gradually reduced and the valve element 16e of the second air control valve 16 is moved in the direction of closure, and the air control passage 11b is also closed. When the air control passages 11a and 11b are closed, the engine 4 is not supplied with the secondary air through the intake side secondary air supply passage, the air/fuel ratio of the mixture is controlled to the rich side. When, on the other hand, the electromagnetic valves 15 and 18 are made operable from the inoperable state, the electromagnetic valve 15 is immediately opened and the secondary air of an amount corresponding to the opening degree of the first air control valve 12, that is, an amount proportional to the main intake air amount, flows through the air control passage 11a. At the same time, the vacuum supply passage 17 is communicated by the electromagnetic valve 18, and the path to the atmospheric pressure supply passage 19 is closed, and the vacuum chamber 16a of the second air control valve 16 is supplied with the vacuum Pr. Therefore, the vacuum level in the vacuum chamber 16a gradually approaches the vacuum Pr, to open the second air control valve 16 and the secondary air starts to flow through the air control passage 11b. As the vacuum level in the vacuum chamber 16a approaches the vacuum Pr, the opening degree of the air control valve 16, that is, the sectional area of the air control passage gradually increases so that the amount of the secondary air is increased. The secondary air respectively flowing through the air control passages 11a and 11b are combined together and supplied to the engine via the air intake side secondary air supply passage 11. In this way the air/fuel ratio of the mixture supplied to the engine is controlled to the lean side and the amount of the secondary air supplied to the engine gradually increases with time.

When, subsequently, the electromagnetic valves 15 and 18 are made inoperable from the operating statem, the air control passage 11a is closed by the closure of the electromagnetic valve 15, and the vacuum supply passage 17 is closed by the electromagnetic valve in the same manner as above, and the part of the vacuum supply passage on the side of the vacuum chamber 16a is communicated to the atmospheric pressure passage 19. Therefore, the vacuum chamber 16a is supplied with the atmospheric pressure and the pressure in the vacuum chamber gradually approaches the atmospheric pressure to gradually decrease the sectional area of the air control passage 11b, and the amount of the secondary air is also gradually decreased. With this operation, the secondary air is supplied to the engine through the air intake side secondary air supply passage 11, particularly through the air control passage 11b after closure of the air control passage 11a. Further the amount of the secondary air is gradually decreased with time.

Figure 3A:
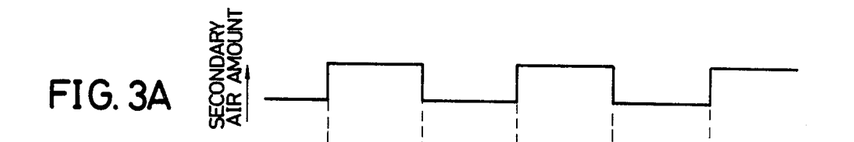
FIGS. 3A to 3C are diagrams showing the amount of the secondary air flowing through the air intake side secondary air supply passage of the system of FIG. 1.
Figure 3B:
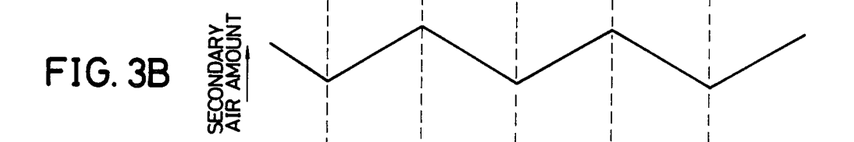
Figure 3C:
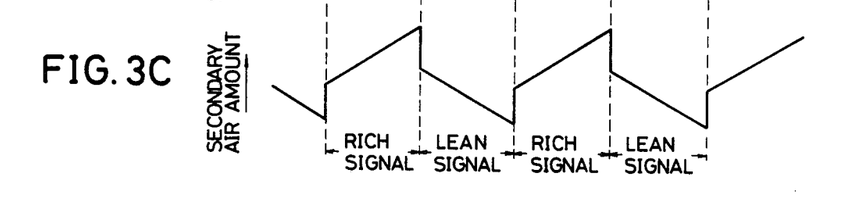

Therefore, in the operation for controlling the air/fuel ratio to a predetermined value, since the rich signal and the lean signal are generated alternately and continuously, the secondary air flows through the air control passage 11a in such a manner as shown in FIG. 3A, to perform the so called proportional (P) control. On the other hand, through the air control passage 11b, the secondary air flows in a manner as shown in FIG. 3B, in which the amount of secondary air increases upon the presence of the rich signal and decreases upon the presence of the lean signal, to perform the so called integration (I) control. Therefore, the total amount of the secondary air flowing through the intake side secondary air passage 11 becomes equal to a summation of the amount of proportional control and the amount of the integral control, as shown in FIG. 3C.

Figure 4:
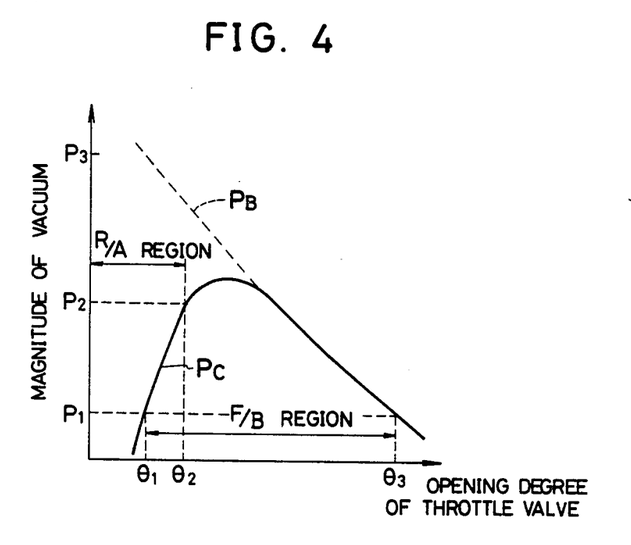
FIG. 4 is a diagram showing the region of the feedback control of the air/fuel ratio and the region of the exhaust side secondary air supply with respect to the opening degree of the throttle valve and the magnitude of the vacuum Pc.

The operation of the system while the engine is decelerating will be explained hereinafter. If an operator of a vehicle running on a level road releases the accelerator pedal, the amount of the intake air will be in turn reduced by the closure of the throttle valve 5 and the deceleration of the engine will initiate. In this state, due to the closure of the throttle valve, the magnitude of the vacuum $P_B$ in the downstream part of the throttle valve 5 becomes greater than the third predetermined pressure value $P_3$ as shown in the graph of FIG. 4, which illustrates the relation between the opening degree of the throttle valve 5 and the levels of the vacuum $P_B$ and $P_C$. Therefore, the vacuum switch 64 immediately turns on. Also, the vacuum switch 60 is turned on by the drop of the vacuum Pc at the vacuum detection hole 8b below the second predetermined value $P_2$. At a time immediately after the closure of the throttle valve 5, the magnitude of the vacuum in the pressure chamber 61a becomes greater than the vacuum Pc, and the nonreturn valve 63 is closed to substantially block the vacuum passage 90. Since the vacuum in the pressure chamber 61 is gradualy released through the orifice 63, the pressure level in the pressure chamber 61 reaches the predetermined first pressure P1 predetermined time after the closure of the throttle valve 5, to turn on the vacuum switch 61. Thus, both of the output signal levels of the vacuum switches 61 and 64 become high, and the output signal level of the NAND gate 79 connected to the AND gate 75 turns to the low level. Therefore, the AND gate 75 supplies a low level signal to the drive circuit 76 regardless of the output signal level of the inverter circuit 74. Since the drive circuit 76 stops the driving of the electromagnetic valves 15 and 18 as in the case of the application of the lean signal, the air control passages 11a and 11b are respectively blocked due to the inoperative states of the electromagnetic valves 15 and 18. Therefore, due to the substantial ceasing of the supply of the air intake side secondary air into the downstream part of the throttle valve 5, the air/fuel ratio of the mixture supplied to the engine is controlled to the rich side of the stoichiometric value. In other words, the operating state of the air/fuel ratio control system will be shifted from the closed loop a to the open loop predetermined time after a time at which the deceleration of the engine is initiated. Further, it is to be noted that the above explained operating procedure in the decelerating state of the engine will also take place during idling of the engine 4.

If the intake air temperature is higher than a predetermined level at the time of the initiation of deceleration of the engine, the intake air temperature switch 69 remains off, and the output signal level of the AND gate 77 turns to the high level upon turning on of the vacuum switch 60, and the drive circuit 83 starts the actuation of the electromagnetic valve 55. As a result, the vacuum $P_B$ is applied to the vacuum chamber 53a of the exhaust side secondary air control valve 53 through the vacuum supply passage 54, to open the valve 53. Therefore, the exhaust side secondary air taken at the air intake port 50 is supplied to the exhaust manifold 10 through the secondary air passage 51 to promote the oxidation of the unburnt component of the exhaust gas by means of the three-way catalytic converter 67. In this state, the nonreturn valve 53g is opened as indicated by the dashed line "a" of FIG. 1.

The operation of the system when the operating state of the engine is turned from the decelerating state to the accelerating state will now be explained. Since the throttle valve 5 is opened in this state by pressing the accelerator pedal, the magnitude of the vacuum Pc will be increased. When the magnitude of the vacuum Pc becomes greater than the first predetermined pressure P1, the vacuum switch 61 immediately turns off. Otherwise, the vacuum switch 64 turns off first since the magnitude of the vacuum $P_B$ becomes lower than the third predetermined pressure level P3. At the time of the turning off of the vacuum switch 61 or 64, the output signal level of the NAND gate 79 turns from the low level to the high level, and the signal level of the AND gate 75 becomes equal to the level change of the output signal of the inverter 74. Therefore, the feedback control of the air/fuel ratio is restarted by the application of the secondary air to the part downstream of the throttle valve 5 in accordance with the output signal of the oxygen sensor 59. When the opening degree of the throttle valve becomes greater and the magnitude of the vacuum Pc is further increased above the second predetermined value P2, the vacuum switch 60 turns off and the output signal level of the AND gate 77 turns from the high level to the low level which in turn stops the driving of the electromagnetic valve 55 via the drive circuit 83. This in turn causes the supply of the atmospheric pressure into the vacuum chamber 53a of the exhaust side secondary air control valve 53, to close the same valve. Thus, the supply of the exhaust side secondary air into the exhaust manifold 10 is stopped.

In the case of the operating state of the engine in which the throttle valve 5 is substantially fully opened to a third opening degree (60°, for instance), the vacuums Pc and $P_B$ become near the atmospheric pressure, that also turns on the vacuum switches 60 and 61. More specifically, when the magnitude of the vacuum Pc is reduced below the second predetermined level P2, the vacuum switch 60 turns on to drive the electromagnetic valve 55 by the drive circuit 83 as described above. However, since the magnitude of the vacuum $P_B$ has also reduced in this state, the exhaust side secondary air valve 53 will not be opened even if the vacuum $P_B$ is applied to the vacuum chamber 53a. Therefore, the exhaust manifold 10 is not supplied with the exhaust side secondary air. Similarly, when the magnitude of the vacuum Pc reaches the first predetermined level P1, the vacuum switch 61 will be turned on after a predetermined time, to stop the feedback control operation of the air/fuel ratio.

Figure 5A:
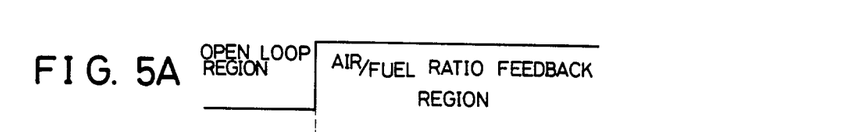
FIGS. 5A and 5B are diagrams showing the region of the air/fuel ratio feedback control and the region of the exhaust side secondary supply with respect to the magnitude of the vacuum Pc.
Figure 5B:
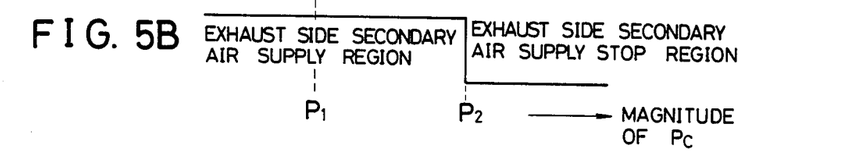

Reference is now made to FIG. 4 and FIGS. 5A and 5B in which a region of air/fuel ratio feedback control is labelled F/B, and a region of the supply of the exhaust side secondary air is labelled R/A. The feedback control of the air/fuel ratio is effected when the magnitude of the vacuum Pc is greater than the first predetermined pressure level P1, and the exhaust side secondary air is supplied when the magnitude of the vacuum Pc is lower than the second predetermined pressure level P2. In other words, when the magnitude of the vacuum Pc lies between the first predetermined pressure level P1, and the second predetermined level P2, both the feedback control of the air/fuel ratio and the supply of the exhaust side secondary air are performed.

On the other hand, if the intake air temperature is below a predetermined value, i.e., during the cold operation, the intake air temperature switch 69 is turned on and a low level output signal whose level is equal to the earth level, is supplied to the AND gate 75, which causes the feedback control of the air/fuel ratio to stop. In addition, during turning on of the intake air temperature switch 69, the output signal level of the AND circuit 77 becomes low irrespective of the on/off operation of the vacuum switch 60, to stop the supply of the exhaust side secondary air to the engine. Further, when the engine speed is higher than a predetermined speed of rotation and the magnitude of the vacuum $P_B$ is lower than a predetermined third value P3, i.e., during a heavy load operation of the engine, the vacuum switch 64 is turned off and the output signal level of the inverter 82 and the rotation speed detection circuit 86 to the NAND gate 80 are both high, to produce a low level signal at the output terminal of the NAND gate 80. Therefore, by this low level signal of the NAND gate 80, the output signal level of the AND gate becomes low. Thus, the feedback control of the air/fuel ratio is stopped also during the heavy load operation of the engine.

In addition, during a light load operation of the engine in which the engine speed is higher than a predetermined level and the magnitude of the vacuum $P_B$ is above the predetermined third level P3, the output signal of the NAND circuit 81 is turned to the low level and the drive circuit 84 ceases the driving of the electromagnetic valve 38. As the result, the vacuum passage 37 is shut off by the inactive state of the electromagnetic valve 38, and the vacuum detection hole of the vacuum passage 37 is blocked. At the same time, the part of the vacuum passage on the side of the valve chamber 32b is communicated with the atmospheric pressure inlet port 34. With this operation, the opening degree of the regulation valve 32 becomes greater and the vacuum Pc is diluted by the atmospheric pressure and the magnitude of the vacuum Pe is reduced. As the result, the opening degree of the EGR control valve 30 is reduced to decrease the amount of EGR.

When the engine coolant temperature of the engine 4 is below a predetermined level and the magnitude of vacuum $P_B$ is above the predetermined third pressure level P3, in other words, when the engine is decelerating or idling before the warming is completed, the temperature switch 70 and the vacuum switch 64 are both turned on and the high level signals are applied from the temperature switch 70 and the vacuum switch 64 to the AND circuit 78 to turn the output signal of the AND circuit to the high level. Therefore, the electromagnetic valve 48 is driven by the drive circuit 85 to shut off the vacuum supply passage 47 and the part of the vacuum supply passage on the side of the vacuum chamber 30a is communicated to the atmospheric pressure inlet port 49. Thus, during deceleration or idling of the engine before the completion of the warming up, the atmospheric pressure is supplied to the vacuum chamber 30a to close the EGR control valve 30 and the EGR operation is stopped by the blocking of the EGR passage 29.

As mentioned before, the non-return valve 44 is provided in the vacuum supply passage 43, and the valve element of the non-return valve 44 is attracted by the vacuum Pe against the biasing force of the valve spring 44a. Therefore, the vacuum Pe acts in the vacuum chamber 12a. However, if the vacuum $P_{AV}$ in the vacuum chamber 12a becomes greater than the magnitude of the vacuum Pe due to the fluctuation of the vacuum $P_{AV}$, then the non-return valve 44 is closed and the vacuum $P_{AV}$ leaks into the vacuum chamber 30a through the orifice 44c. Therefore, the fluctuation of the vacuum $P_{AV}$ will be smoothed out and applied to the vacuum chamber 30a of the EGR control valve 30.

Figure 6:
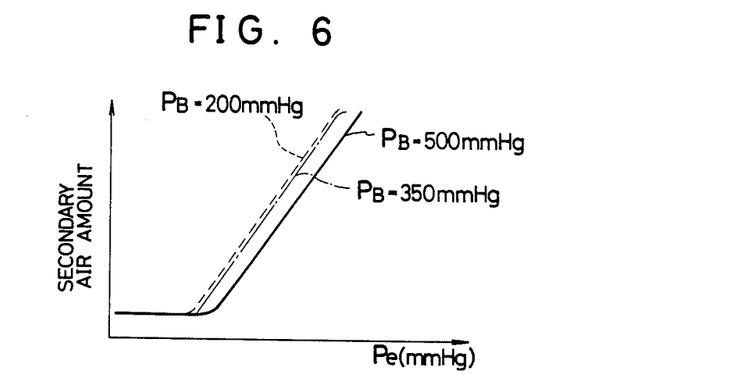
FIG. 6 is a diagram showing the secondary air supply amount with respect to the magnitude of the vacuum Pe at different values of the vacuum $P_B$.
Figure 7:
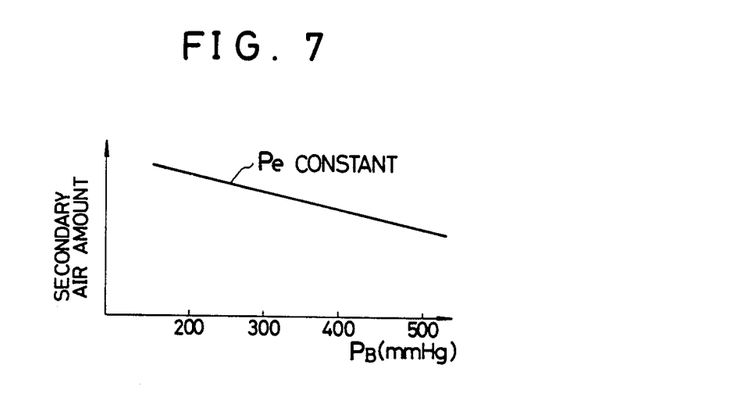
FIG. 7 is a diagram showing the secondary air supply amount with respect to the magnitude of the vacuum $P_B$ at a constant value of vacuum Pe.

FIG. 6 is a diagram showing the relationship between the amount of the secondary air and the magnitude of the vacuum Pe under different pressure value $P_B$ as the fixed parameter. FIG. 7 is a diagram showing the relationship between the vacuum $P_B$ and the amount of the air intake side secondary air at a vacuum Pe as the constant parameter. As shown, the amount of the secondary air decreases as the magnitude of the vacuum $P_B$ increases under a fixed pressure Pe.

Further, it should be noted that the above explained control circuit can be made by a microcomputer which includes a microprocessor, a RAM, a ROM, and an A/D converter, etc., and which performs an operation similar to the above explained operation by following predetermined program steps. In addition, though the engine load is detected in terms of the magnitude of vacuum in the vicinity of the throttle valve, a throttle opening sensor utilizing a potentiometer for example, or a throttle open switch may be used for determining the magnitude of the engine load.

Figure 8:
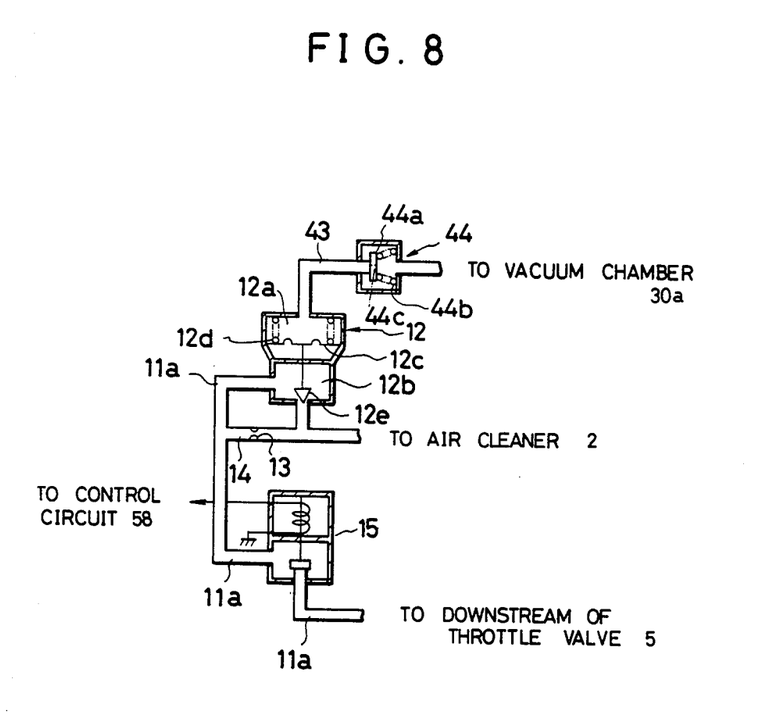
FIG. 8 is a schematic diagram showing a part of a modification of the air intake side secondary air supply system according to the present invention.

As will be understood from the foregoing, the control pressure is applied to the vacuum chamber of the air control valve disposed in the air intake side secondary passage communicating with the downstream part of the throttle valve via a delay means, and the delay means is constructed to delay only the transmission of the pressure from the pressure chamber of the air control valve to the source of the control pressure including the pressure chamber of the EGR control valve. Therefore, even though pulsation of the air pressure in the pressure chamber of the air control valve occurs as the result of the attraction of the valve element of the air control valve by the vacuum downstream of the throttle valve, the pulsation is transmitted after being smoothed out by the delay means to the source of the control pressure. Thus, the pulsation of the air pressure in the pressure chamber of the EGR control valve which might occur in the conventional arrangement, and the adverse effect on the operation of the EGR system are prevented. Further, in accordance with the present invention, in the event that the arrangement of the system is such that, as shown in FIG. 8, the direction of the flow of the secondary air in the valve chamber 12b is contrary to the corresponding direction in the system of FIG. 1, and the valve element is attracted to open the valve and thus the vacuum chamber 12a contracts, the transmission of the pulsation of air pressure in the pressure chamber 12a to the pressure chamber of the EGR valve, i.e., the vacuum chamber 30a, can also be prevented by providing the delay means such as the non-return valve 44 in the vacuum supply passage 43.

Preferred embodiments of the present invention have been described above. It should be understood, however, that the foregoing description has been for the purpose of illustration only, and is not intended to limit the scope of the present invention. Rather, there are numerous equivalents to the preferred embodiment.

What is claimed is:

1. An air intake side secondary air supply system for an internal combustion engine equipped with an exhaust gas recirculation system including an EGR passage connecting an exhaust gas passage and an intake air passage of said engine, an EGR flow control valve responsive to a pressure level in a first pressure chamber thereof being disposed in said EGR passage for varying the sectional area of said EGR passage, comprising:

an air intake side secondary air supply passage leading to said intake air passage, downstream of a throttle valve, for supplying atmospheric air;

an air control valve, responsive to a pressure level in a second pressure chamber thereof, disposed in said secondary air supply passage for varying the sectional area of said secondary air supply passage;

an air/fuel ratio determination means for determining the air/fuel ratio from composition of an exhaust gas flowing in said exhaust gas passage and producing therefrom an air/fuel ratio signal;

an open/close valve disposed in said air intake side secondary air supply passage, downstream of said air control valve, said open/close valve being adapted to open and close in response to said air/fuel ratio signal;

a control pressure source for supplying a first control pressure to said first pressure chamber of said EGR flow control valve via a first pressure supply passage;

a second pressure supply passage for joining said first pressure supply passage and said second pressure chamber of said air control valve; and a delay means provided to one of said first and second pressure supply passages, for delaying the transmission of a pressure fluctuation in said second pressure chamber of said air control valve to said first pressure chamber of said EGR control valve, said pressure fluctuation being effectuated by the application of a vacuum of said intake air passage to said air control valve through said air intake side secondary air supply passage during transitory operating periods of said open/close valve.

2. An air intake side secondary air supply system as set forth in claim 1, wherein said delay means comprises a non-return valve for allowing a flow of fluid from said second pressure chamber of said air control valve to said one of said first and second pressure supply passages, said non-return valve having a valve element and an orifice provided in said valve element for joining said second pressure chamber and said one of said first and second pressure supply passages.

* * * * *